United States Patent
Yamamoto et al.

(10) Patent No.: US 10,637,087 B2
(45) Date of Patent: Apr. 28, 2020

(54) ELECTROLYTE MEMBRANE, METHOD FOR PRODUCING THE SAME, AND MEMBRANE-ELECTRODE ASSEMBLY FOR FUEL CELLS THAT INCLUDES ELECTROLYTE MEMBRANE

(71) Applicant: NITTO DENKO CORPORATION, Ibaraki-shi, Osaka (JP)

(72) Inventors: Mizuki Yamamoto, Osaka (JP); Koso Matsuda, Osaka (JP); Takeshi Nakano, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 148 days.

(21) Appl. No.: 16/060,787

(22) PCT Filed: Dec. 9, 2016

(86) PCT No.: PCT/JP2016/005099
§ 371 (c)(1),
(2) Date: Jun. 8, 2018

(87) PCT Pub. No.: WO2017/098732
PCT Pub. Date: Jun. 15, 2017

(65) Prior Publication Data
US 2018/0366754 A1    Dec. 20, 2018

(30) Foreign Application Priority Data
Dec. 11, 2015   (JP) .................. 2015-242281

(51) Int. Cl.
*H01M 8/10* (2016.01)
*C08F 261/04* (2006.01)
(Continued)

(52) U.S. Cl.
CPC ......... *H01M 8/1044* (2013.01); *C08F 261/04* (2013.01); *C08J 5/22* (2013.01);
(Continued)

(58) Field of Classification Search
CPC ............. H01M 8/1044; H01M 8/1058; H01M 8/1023; H01M 8/1088; H01M 8/1004;
(Continued)

(56) References Cited

U.S. PATENT DOCUMENTS

| 5,128,041 A | 7/1992 | Degen et al. |
| 2007/0224480 A1 | 9/2007 | Yoshida et al. |

(Continued)

FOREIGN PATENT DOCUMENTS

| JP | H06271687 A | 9/1994 |
| JP | H11135137 A | 5/1999 |

(Continued)

OTHER PUBLICATIONS

Extended European Search Report issued for European Patent Application No. 16872633.9, dated May 9, 2019, 7 pages.
(Continued)

*Primary Examiner* — Michael Bernshteyn
(74) *Attorney, Agent, or Firm* — Hamre, Schumann, Mueller & Larson, P.C.

(57) ABSTRACT

The electrolyte membrane of the present disclosure includes a phase A forming a matrix phase, and a phase B. The phase B is continuous from a first principal surface of the electrolyte membrane to a second principal surface of the electrolyte membrane opposite to the first principal surface. The phase B includes a graft polymer having a main chain and a graft chain. The graft chain has a functional group having anion-exchange ability. The main chain preferably has no functional group having anion-exchange ability. The electrolyte membrane of the present disclosure can reliably
(Continued)

maintain the function as a separation membrane even when decomposition reaction by a peroxide occurs.

15 Claims, 1 Drawing Sheet

(51) Int. Cl.
|  |  |
| --- | --- |
| *H01B 1/06* | (2006.01) |
| *C08J 9/42* | (2006.01) |
| *C08J 5/22* | (2006.01) |
| *H01M 8/1044* | (2016.01) |
| *H01M 8/1058* | (2016.01) |
| *H01M 8/1023* | (2016.01) |
| *H01M 8/1088* | (2016.01) |
| *H01M 8/1004* | (2016.01) |
| *H01M 8/103* | (2016.01) |
| *H01M 8/1072* | (2016.01) |
| *H01M 8/1018* | (2016.01) |

(52) U.S. Cl.
CPC ............... *C08J 5/2231* (2013.01); *C08J 9/42* (2013.01); *H01B 1/06* (2013.01); *H01M 8/103* (2013.01); *H01M 8/1004* (2013.01); *H01M 8/1023* (2013.01); *H01M 8/1058* (2013.01); *H01M 8/1072* (2013.01); *H01M 8/1088* (2013.01); *C08J 2323/06* (2013.01); *C08J 2451/06* (2013.01); *H01M 2008/1095* (2013.01); *H01M 2300/0082* (2013.01); *Y02P 70/56* (2015.11)

(58) Field of Classification Search
CPC ............... H01M 8/103; H01M 8/1072; H01M 200/1095; H01M 2300/0082; C08F 261/04; C08J 9/42; C08J 5/23; C08J 5/2231; C08J 2323/06; C08J 2451/06
USPC ........................................................ 429/482
See application file for complete search history.

(56) References Cited

U.S. PATENT DOCUMENTS

| 2011/0281197 A1* | 11/2011 | Daikoku | ............... C08F 226/04 429/480 |
| --- | --- | --- | --- |
| 2015/0010848 A1* | 1/2015 | Suzuki | ............... H01M 8/1023 429/492 |

FOREIGN PATENT DOCUMENTS

| JP | H11335473 A |   | 12/1999 |
| --- | --- | --- | --- |
| JP | 2007335119 A | * | 12/2007 |
| JP | 2008204647 A | * | 9/2008 |
| JP | 2009173786 A |   | 8/2009 |
| WO | 2008029761 |   | 3/2008 |
| WO | 2010055889 A1 |   | 5/2010 |

OTHER PUBLICATIONS

International Search Report issued for International Patent Application No. PCT/JP2016/005099, dated Feb. 21, 2017, 5 pages including English translation.

* cited by examiner

ELECTROLYTE MEMBRANE, METHOD FOR PRODUCING THE SAME, AND MEMBRANE-ELECTRODE ASSEMBLY FOR FUEL CELLS THAT INCLUDES ELECTROLYTE MEMBRANE

TECHNICAL FIELD

The present invention relates to an electrolyte membrane, a method for producing the same, and a membrane-electrode assembly for fuel cells that includes an electrolyte membrane.

BACKGROUND ART

Polymer electrolyte fuel cells have the advantage of being operable in a temperature range around ordinary temperature and are promising for use in a wide variety of fields. In particular, anion-exchange fuel cells do not necessarily require the use of platinum as a catalyst and thus allow cost reduction. Furthermore, anion-exchange fuel cells permit the use of a liquid fuel and can thus be reduced in size. Anion-exchange fuel cells have a separation membrane between an anode and a cathode, and an anion-exchange electrolyte membrane is used as the separation membrane. The anion-exchange electrolyte membrane has a functional group having anion-exchange ability such as a quaternary ammonium group. A method for producing an anion-exchange electrolyte membrane is one in which pores of a microporous polymer base material made of polyolefin resin or the like are filled with an anion-exchange resin which is an electrolyte polymer (see Patent Literature 1, for example).

CITATION LIST

Patent Literature

Patent Literature 1: WO 2010/055889 A1

SUMMARY OF INVENTION

Technical Problem

In an anion-exchange fuel cell, oxidation reaction of a fuel occurs at the anode, while reduction reaction of oxygen occurs at the cathode. Other than the oxidation-reduction reaction, a side reaction may occur to produce a peroxide. This peroxide or radicals generated from the peroxide (these may hereinafter be collectively referred to as a peroxide) attacks the portion of the electrolyte membrane that contains the functional group having anion-exchange ability, thus resulting in deterioration of the electrolyte membrane.

As for the electrolyte membrane of Patent Literature 1 in which pores of a microporous polymer base material are filled with an electrolyte polymer, it is conceivable that decomposition of the electrolyte polymer by a peroxide will lead to the formation of voids in the electrolyte membrane. Such an electrolyte membrane can fail to fulfill the function as a separation membrane in a fuel cell.

It is an object of the present invention to provide an electrolyte membrane capable of reliably maintaining the function as a separation membrane even when decomposition reaction by a peroxide occurs. Another object of the present invention is to provide a production method suitable for producing the electrolyte membrane. Still another object of the present invention is to provide a membrane-electrode assembly (MEA) including the electrolyte membrane.

Solution to Problem

The present invention provides an electrolyte membrane including a phase A forming a matrix phase, and a phase B, wherein the phase B is continuous from a first principal surface of the electrolyte membrane to a second principal surface of the electrolyte membrane opposite to the first principal surface, the phase B includes a graft polymer having a main chain and a graft chain, and the graft chain has a functional group having anion-exchange ability.

In another aspect, the present invention provides a MEA for a fuel cell, including the electrolyte membrane of the present invention.

In still another aspect, the present invention provides an electrolyte membrane production method for producing the electrolyte membrane of the present invention, including:

applying radiation to a membrane (I) having a phase A forming a matrix phase and a phase B' containing a polymer; and introducing a graft chain into the polymer contained in the phase B' with the polymer serving as a main chain, and thereby forming a graft polymer having the main chain and the graft chain, wherein the graft chain is a polymer chain derived from a polymerizable monomer containing a vinyl group and a functional group capable of having anion-exchange ability.

Advantageous Effects of Invention

The present invention can provide an electrolyte membrane capable of reliably maintaining the function as a separation membrane even when decomposition reaction by a peroxide occurs and capable of, for example, preventing direct mixing of a fuel and an oxidant (typical examples of which are oxygen and air). The present invention can also provide a MEA exploiting the features of the electrolyte membrane. The present invention can further provide a production method suitable for producing the electrolyte membrane.

DESCRIPTION OF EMBODIMENTS

Figure 1:
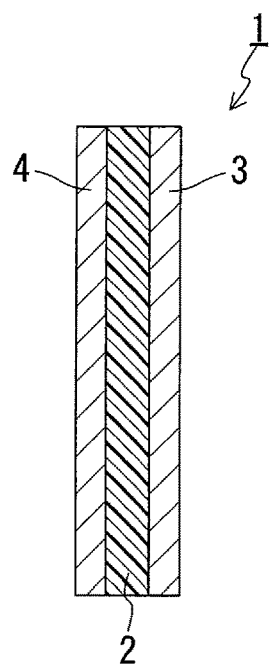
FIG. 1 is a cross-sectional view schematically showing an exemplary MEA of the present invention.

A first aspect of the present disclosure provides an electrolyte membrane including a phase A forming a matrix phase, and a phase B, wherein the phase B is continuous from a first principal surface of the electrolyte membrane to a second principal surface of the electrolyte membrane opposite to the first principal surface, the phase B includes a graft polymer having a main chain and a graft chain, and the graft chain has a functional group having anion-exchange ability.

A second aspect of the present disclosure provides the electrolyte membrane as set forth in the first aspect, wherein the matrix phase is in the form of a porous membrane, and the phase B is formed to fill pores of the porous membrane.

A third aspect of the present disclosure provides the electrolyte membrane as set forth in the first or second aspect, wherein the main chain of the graft polymer has no functional group having anion-exchange ability.

A fourth aspect of the present disclosure provides the electrolyte membrane as set forth in any one of the first to third aspects, wherein the main chain of the graft polymer has a polar group.

A fifth aspect of the present disclosure provides the electrolyte membrane as set forth in the fourth aspect, wherein the polar group is at least one selected from the group consisting of a hydroxyl group, a carboxyl group, an ester group, an ether group, an amide group, and an amino group.

A sixth aspect of the present disclosure provides the electrolyte membrane as set forth in any one of the first to fifth aspects, wherein the graft chain has a structural unit containing a cyclic quaternary ammonium salt.

A seventh aspect of the present disclosure provides the electrolyte membrane as set forth in the sixth aspect, wherein the structural unit containing a cyclic quaternary ammonium salt is a structural unit represented by the following formula (1);

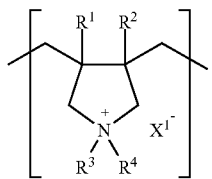

(1)

wherein $R^1$ to $R^4$ are each independently a hydrogen atom or an alkyl group having 1 to 8 carbon atoms, and $X^{1-}$ is a halide ion, a hydroxide ion, or an anion of an organic or inorganic acid.

An eighth aspect of the present disclosure provides a membrane-electrode assembly for a fuel cell, including the electrolyte membrane as set forth in any one of the first to seventh aspects.

A ninth aspect of the present disclosure provides an electrolyte membrane production method for producing the electrolyte membrane as set forth in any one of the first to seventh aspects, including; applying radiation to a membrane (I) having a phase A forming a matrix phase and a phase B' containing a polymer; and introducing a graft chain into the polymer contained in the phase B' with the polymer serving as a main chain, and thereby forming a graft polymer having the main chain and the graft chain, wherein the graft chain is a polymer chain derived from a polymerizable monomer containing a vinyl group and a functional group capable of having anion-exchange ability.

A tenth aspect of the present disclosure provides the electrolyte membrane production method as set forth in the ninth aspect, further including forming the membrane (I) by filling pores of a porous membrane composing the phase A with the polymer composing the phase B'.

An eleventh aspect of the present disclosure provides the electrolyte membrane production method as set forth in the ninth or tenth aspect, wherein the main chain has no functional group capable of having anion-exchange ability.

A twelfth aspect of the present disclosure provides the electrolyte membrane production method as set forth in any one of the ninth to eleventh aspects, wherein the main chain has a polar group.

A thirteenth aspect of the present disclosure provides the electrolyte membrane production method as set forth in the twelfth aspect, wherein the polar group is at least one selected from the group consisting of a hydroxyl group, a carboxyl group, an ester group, an ether group, an amide group, and an amino group.

A fourteenth aspect of the present disclosure provides the electrolyte membrane production method as set forth in any one of the ninth to thirteenth aspects, wherein the graft chain has a structural unit containing a cyclic quaternary ammonium salt.

A fifteenth aspect of the present disclosure provides the electrolyte membrane production method as set forth in the fourteenth aspect, wherein the structural unit containing a cyclic quaternary ammonium salt is a structural unit represented by the following formula (1):

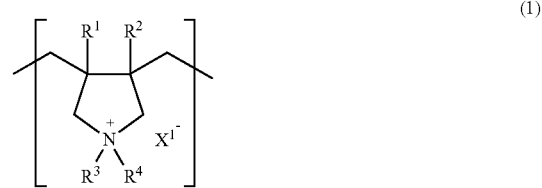

(1)

wherein $R^1$ to $R^4$ are each independently a hydrogen atom or an alkyl group having 1 to 8 carbon atoms, and $X^{1-}$ is a halide ion, a hydroxide ion, or an anion of an organic or inorganic acid.

The following description illustrates an embodiment of the present invention. The present invention is not limited to the embodiment described below.

An electrolyte membrane (anion-exchange electrolyte membrane) of the present embodiment includes a phase A forming a matrix phase and a phase B. The phase B includes a graft polymer having a main chain and a graft chain bonded to the main chain. The graft chain has a functional group having anion-exchange ability. The phase B is continuous from a first principal surface of the electrolyte membrane to a second principal surface of the electrolyte membrane opposite to the first principal surface. In the electrolyte membrane, the phase B is a phase different from the phase A and, for example, the phase A and phase B can be in a phase-separated condition between the phase A and the phase B. The phase B is a continuous phase that is continuous from the first principal surface to the second principal surface of the electrolyte membrane. However, it is not necessary that all of the regions belonging to the phase B be a "continuous region" which is continuous from the first principal surface to the second principal surface of the electrolyte membrane. For example, the phase B may include an isolated region and/or a region having one end contiguous to a continuous region and the other end which is a blind end. The phase B including the graft polymer having a functional group having anion-exchange ability is a conducting phase through which anions are transferred between the first principal surface and the second principal surface of the electrolyte membrane.

A functional group having anion-exchange ability, such as a quaternary ammonium group, has a positive charge. It is generally considered that a moiety having such a functional group is susceptible to attack by peroxides, and the molecular chain having the moiety is likely to be cleaved by peroxides.

As for the electrolyte membrane of the present embodiment, it is considered that the molecular chain of the graft chain having a functional group having anion-exchange ability is likely to be cleaved by peroxides. However, the electrolyte membrane of the present embodiment includes, together with the graft chain, the phase A forming a matrix phase and the main chain of the graft polymer contained in the phase B, and the molecular chains of the phase A and the main chain are more resistant to cleavage than the molecular chain of the graft chain. Thus, even if the graft chain of the phase B is cleaved, the phase A and the main chain of the graft polymer of the phase B are expected to remain intact so that voids are less likely to be formed in the electrolyte membrane. The electrolyte membrane of the present embodiment can therefore reliably maintain the function as a separation membrane and can prevent leakage of a fuel or undesired direct mixing of a fuel and an oxidant (typical examples of which are oxygen and air). Additionally, with the use of the electrolyte membrane of the present embodiment in a fuel cell, electrical short circuit is unlikely to occur between the anode and cathode sandwiching the membrane, and the safety of the fuel cell is further improved.

The material forming the phase A is not limited. The phase A is typically formed of a resin.

The conducting ionic species in the electrolyte membrane of the present embodiment is a hydroxide ion, and the electrolyte membrane is used in an alkaline environment. It is therefore preferable that the resin forming the phase A have high resistance to alkali. Considering the use in an anion-exchange fuel cell employing a liquid fuel, the resin forming the phase A preferably has high water resistance, in particular, high hot-water resistance. The resin forming the phase A is, for example, at least one selected from the group consisting of a polyolefin and polystyrene. Examples of the polyolefin include ultrahigh molecular weight polyethylene, high-density polyethylene, low-density polyethylene, polypropylene, polybutene, and polymethylpentene. From the viewpoint of achieving high heat resistance and processability, the phase A preferably includes ultrahigh molecular weight polyethylene and can be a phase composed of ultrahigh molecular weight polyethylene.

The resin forming the phase A preferably has no functional group having anion-exchange ability. Resins having no functional group having anion-exchange ability are resistant to decomposition by peroxides.

Examples of the functional group having anion-exchange ability are quaternary ammonium groups. The quaternary ammonium groups include quaternary ammonium salt groups.

The resin forming the phase A is preferably a hydrophobic resin. The resin forming the phase A preferably has a water content of 0.1% or less. The water content can be determined by a measurement method as described below.

The resin forming the phase A preferably does not have a polar group. The polar group is, for example, at least one functional group selected from the group consisting of a hydroxyl group, a carboxyl group, an ester group, an ether group, an amide group, and an amino group.

The main chain of the graft polymer contained in the phase B (or the polymer forming the main chain) preferably has no functional group having anion-exchange ability. Even if the main chain has such a functional group, the density of the functional group in the main chain is lower than the density of the functional group in the graft chain. In the graft polymer contained in the phase B, only the graft chain may have a functional group having anion-exchange ability. Such a polymer can be a graft polymer having a main chain having no functional group having anion-exchange ability and a graft chain bonded to the main chain and having a functional group having anion-exchange ability. When the main chain of the graft polymer has no functional group having anion-exchange ability, this main chain is more resistant to decomposition by peroxides. Specific functional groups having anion-exchange ability are as described above.

The polymer forming the main chain is preferably insoluble in water and stable in an alkaline environment. Examples of the polymer forming the main chain include: polycarbonate; polyesters such as polyethylene terephthalate; cellulose and cellulose derivatives such as cellophane; polyvinyl acetals such as polyvinyl formal and polyvinyl butyral; polyamides such as nylon; poly(meth)acrylate; urea resin; phenolic resin; melamine resin; epoxy resin; acetal resin (polyacetal); polyvinyl acetate; polyvinyl alcohol; ethylene-vinyl alcohol copolymer; hydrophilized polyolefin; and hydrophilized polystyrene. The hydrophilized polyolefin and the hydrophilized polystyrene can be a polymer into which a polar group has been introduced by hydrophilization. The polar group introduced into the polyolefin or polystyrene by hydrophilization is, for example, a hydroxyl group. The polymer forming the main chain is preferably at least one selected from the group consisting of polyvinyl alcohol, ethylene-vinyl alcohol copolymer, and hydrophilized polyolefin.

The ethylene content in the ethylene-vinyl alcohol copolymer which may be the polymer forming the main chain is preferably 1 to 99 mol % and more preferably 20 to 50 mol %. If the ethylene content is excessively low, the main chain may be easily soluble in water. If the ethylene content is excessively high, the introduction of the graft chain into the main chain formed of the ethylene-vinyl alcohol copolymer may be difficult.

The degree of saponification of polyvinyl alcohol which may be the polymer forming the main chain is preferably 70 mol % or more and more preferably 98 mol % or more. If the degree of saponification is excessively low, the main chain may be easily soluble in water.

The polymer forming the main chain preferably has an appropriate level of hydrophilicity. The polymer forming the main chain preferably has a water content more than 0.1%. The water content of the polymer is more preferably more than 0.1% and not more than 100%, and is even more preferably 1% or more and 80% or less, still even more preferably 2% or more and 60% or less, still even more preferably 4% or more and 40% or less, and still even more preferably 5% or more and 20% or less. When the polymer forming the main chain has a water content as specified above, the introduction of the graft chain into the main chain may be easy.

The water content refers to the ratio of a weight difference to the weight of the dried polymer, the weight difference being determined by subtracting the weight of the dried polymer from the weight of the water-impregnated polymer. The "dried polymer" refers to the polymer left to dry in a 60° C. atmosphere for 2 hours or more. The "water-impregnated polymer" refers to the polymer prepared by immersing the dried polymer in water maintained at 30° C. for 2 hours or more. Leaving the polymer to dry in a 60° C. atmosphere for 2 hours or more means bringing the polymer into a state where a further change in weight of the polymer is not induced by drying. The time during which the polymer is left to dry only has to be 2 hours or more and may be, for example, 2 hours or 3 hours. The state where a change in weight of the polymer is not induced means that, for example, the weight difference between the weight $W_{t1}$ of the polymer as determined after the polymer is left to dry in a 60° C. atmosphere for a predetermined time (time t1) of 2 hours or more and the weight $W_{t1+0.5}$ of the polymer as determined after the polymer is left to dry for another 30 minutes (t1+0.5 hours) is in the range of ±0.5% of the weight $W_{t1}$. Keeping the polymer immersed in water maintained at 30° C. for 2 hours or more means bringing the polymer into a state where a further change in weight of the polymer is not induced by immersion. The time during which the polymer is immersed in water only has to be 2 hours or more and may be, for example, 2 hours or 3 hours. The state where a change in weight of the polymer is not induced means that, for example, the weight difference between the weight $W_{t2}$ of the polymer as determined after the polymer is immersed in water maintained at 30° C. for a predetermined time (time t2) of 2 hours or more and the weight $W_{t2+0.5}$ as determined after the polymer is immersed for another 30 minutes (t2+0.5 hours) is in the range of ±0.5% of the weight $W_{t2}$.

The polymer forming the main chain preferably contains a polar group (except for the above-described functional group having anion-exchange ability). The polar group is preferably at least one selected from the group consisting of a hydroxyl group, a carboxyl group, an ester group, an ether group, an amide group, and an amino group. The polar group is more preferably a hydroxyl group, because in this case the polymer having the polar group exhibits high alkali resistance and is resistant to staining. The polar group may be one introduced into the polymer by a treatment for introducing the polar group.

The introduction of the polar group may be accomplished by a commonly used technique such as corona treatment, plasma treatment, or UV treatment. The technique used may be one in which the polar group is introduced through a reaction with a radical formed by application of radiation such as electron radiation.

In the electrolyte membrane of the present embodiment, an anion is conducted by the functional group having anion-exchange ability in the graft chain. Being capable of this anion conduction, the membrane functions as an electrolyte membrane. The graft chain preferably has a structural unit containing a cyclic quaternary ammonium salt. The cyclic quaternary ammonium salt is a salt having a molecular structure containing a ring structure, and at least one of the carbon atoms involved in the ring structure, typically one of the carbon atoms, is substituted by a nitrogen atom which forms the quaternary ammonium group. The ring structure may have a heteroatom other than the nitrogen atom forming the quaternary ammonium group and may have, for example, a nitrogen atom or oxygen atom as an atom involved in the ring structure and/or as an atom linked to another atom involved in the ring structure. In one form, the cyclic quaternary ammonium salt has not only the above ring structure but also an additional ring structure linked to the nitrogen atom involved in the quaternary ammonium group (this nitrogen atom is also a constituent atom of the additional ring structure). At least one of the carbon atoms forming the additional ring structure, in particular a saturated carbon chain forming the additional ring structure or a part of the carbon atoms contained in the saturated carbon chain, may be substituted by a heteroatom.

The ammonium group of a cyclic quaternary ammonium salt, unlike benzyltrialkylammonium which is a quaternary ammonium group commonly used as an anion-exchange group, has no benzylic position and is less prone to a nucleophilic substitution reaction by OH⁻ in an alkaline environment. Furthermore, a structural unit containing a cyclic quaternary ammonium salt is less prone to an elimination reaction (E2 reaction) originating from the hydrogen atom present at the β-position with respect to the nitrogen atom, because the nitrogen atom is contained in the ring structure. Therefore, the structural unit containing a cyclic quaternary ammonium salt has high alkali resistance, and is less likely to suffer deterioration of the quaternary ammonium group in a high-temperature atmosphere than the benzyltrialkylammonium structure.

Specific examples of the structural unit containing a cyclic quaternary ammonium salt are a structural unit represented by the formula (1) shown below and a structural unit represented by the formula (2) shown below. The structural unit containing a cyclic quaternary ammonium salt is preferably the structural unit represented by the formula (1). An specific example of the structural unit represented by the formula (1) is a structural unit derived from diallyldimethylammonium chloride (DADMAC).

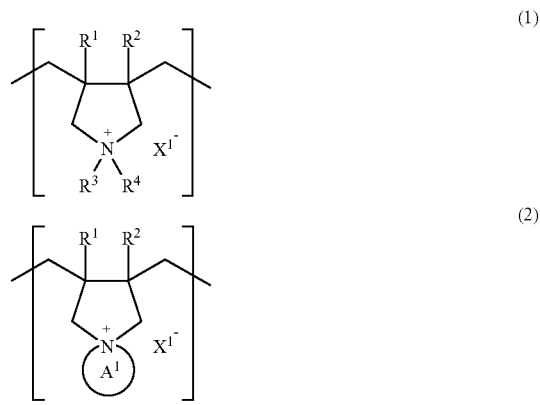

In the formulae, $R^1$ to $R^6$ are each independently a hydrogen atom or an alkyl group having 1 to 8 carbon atoms. $R^1$, $R^2$, $R^5$, and $R^6$ are preferably each independently a hydrogen atom or an alkyl group having 1 to 4 carbon atoms. $R^3$ and $R^4$ are preferably each independently an alkyl group having 1 to 4 carbon atoms.

In the structural unit represented by the formula (2), the molecular structure $A^1$ linked to the nitrogen atom to form an additional ring structure together with the nitrogen atom has a saturated carbon chain having 3 to 7 carbon atoms or a structure resulting from substitution of a heteroatom for a part of the carbon atoms contained in the saturated carbon chain. The structure $A^1$ preferably has a saturated carbon chain having 3 to 5 carbon atoms or a structure resulting from substitution of a heteroatom for a part of the carbon atoms contained in the saturated carbon chain. The heteroatom is, for example, a nitrogen atom or an oxygen atom.

For electrolyte membranes, it is common practice to exchange the counter anion of the quaternary ammonium group for another anion where necessary. Thus, $X^{1-}$ and $X^{2-}$ in the formulae (1) and (2) are not particularly limited as long as they are not difficult to exchange for other anions, and can be known counter anions. For example, $X^{1-}$ and $X^{2-}$ are each independently a halide ion, a hydroxide ion, or an anion of an organic or inorganic acid. Given that the counter anion is a hydroxide ion when the electrolyte membrane is used, $X^{1-}$ and $X^{2-}$ may be preferably a hydroxide ion. From the viewpoint of the storage stability of the functional group having anion-exchange ability, $X^{1-}$ and $X^{2-}$ may be preferably a halide ion or an anion of an organic acid. The halide ion is, for example, a fluoride ion, a chloride ion, a bromide ion, or an iodide ion. The halide ion is preferably a fluoride ion, a chloride ion, or a bromide ion because these ions are easily exchangeable for other anions. The anion of an organic acid is preferably a bistrifluoromethanesulfonimide anion, a thiocyanate anion, or a tetrakis[3,5-bis(trifluoromethyl)phenyl]borate anion. The anion of an inorganic acid is preferably a carbonate ion, a hydrogen carbonate ion, a tetrafluoroborate anion, or a hexafluorophosphate anion.

In the electrolyte membrane of the present embodiment, the mixing ratio between the phase A and the phase B, as expressed by the volume percentage of the phase B in the electrolyte membrane, is 20 to 85%, for example. The volume percentage of the phase A in the electrolyte membrane is, for example, 15 to 80%. The electrolyte membrane can have a phase other than the phases A and B as long as the effect of the present invention is obtained.

In the electrolyte membrane of the present embodiment, the specific forms of the phase A and the phase B are not limited as long as the requirements described above are met. In one form of the electrolyte membrane, the phase A which is a matrix phase is in the form of a porous membrane, while the phase B is formed to fill the pores of the porous membrane. The phase B in this form is a continuous phase extending continuously from the first principal surface to the second principal surface of the electrolyte membrane through the pores of the porous membrane which is the phase A. As previously stated, it is not necessary that all of the regions belonging to the phase B be a continuous region. From another aspect, the electrolyte membrane in this form is composed of a porous membrane and a polymer phase filling the pores of the porous membrane, this polymer phase includes a graft polymer having a main chain and a graft chain, and this graft chain has a functional group having anion-exchange ability. When the form of a porous membrane is employed as the matrix phase, expansion in the in-plane direction of the electrolyte membrane can be reduced.

The porous membrane is formed of, for example, a resin. The specific examples and preferred examples of the resin forming the porous membrane are the same as the resins mentioned above for the phase A.

The amount of area change of the electrolyte membrane of the present embodiment may be, for example, in the range of 1 to 15%. A smaller amount of area change reduces the occurrence of separation between the electrolyte membrane and a catalyst layer in a MEA. The amount of area change can be measured by the method described in Examples below.

The thickness of the electrolyte membrane of the present embodiment may be, for example, in the range of 5 μm to 250 μm, in the range of 5 to 150 μm, or in the range of 10 to 100 μm. The electrolyte membrane with such a thickness has high membrane resistance, is resistant to breakage, has high strength, and suffers less from defects such as pinholes.

(Method for Producing Electrolyte Membrane)

An exemplary production method suitable for producing the electrolyte membrane of the present disclosure will be described. This production method includes: applying radiation to a membrane (I) including a phase A forming a matrix phase and a phase B' containing a polymer; and introducing a graft chain into the polymer contained in the phase B' with the polymer serving as a main chain, and thereby forming a graft polymer having the main chain and the graft chain. The graft chain introduced into the main chain formed of the polymer contained in the phase B' is formed by polymerization of a polymerizable monomer containing a vinyl group and a functional group capable of having anion-exchange ability. That is, the graft chain introduced is a polymer chain derived from the polymerizable monomer. The graft chain has a structural unit derived from the polymerizable monomer. The graft chain (the polymer chain) may consist of the structural unit derived from the polymerizable monomer or may further have a structural unit other than the structural unit derived from the polymerizable monomer as long as the effect of the present invention is obtained. This production method includes the step of applying radiation to the membrane (I) and the subsequent graft polymerization step.

The phase A of the membrane (I) is the same as the phase A of the electrolyte membrane.

The phase B' is a precursor phase of the phase B. The phase B' is converted to the phase B of the electrolyte membrane of the present disclosure through the graft polymerization step and, if necessary, the below-described conversion step performed on the graft polymer. The phase B' is typically continuous from a first principal surface of the membrane (I) to a second principal surface of the membrane (I) opposite to the first principal surface. In the membrane (I), the phase B' is a phase different from the phase A and, for example, the phase A and phase B' can be in a phase-separated condition between the phase A and the phase B. The phase B' may be a continuous phase that is continuous from the first principal surface to the second principal surface of the membrane (I). In this case, as in the case of the phase B of the electrolyte membrane, it is not necessary that all of the regions belonging to the phase B' be a "continuous region" which is continuous from the first principal surface to the second principal surface of the membrane (I). The phase B' typically has the same form as the phase B.

The polymer contained in the phase B' is a precursor polymer for the graft polymer contained in the phase B of the electrolyte membrane. The graft polymer contained in the phase B of the electrolyte membrane is formed by introducing a graft chain into the main chain formed of the polymer contained in the phase B' and, if necessary, by performing the conversion step described below. The membrane (I) is a precursor membrane to be converted to an electrolyte membrane through such formation of the graft polymer.

The radiation applied to the membrane (I) in the production method of the present embodiment is, for example, ionizing radiation such as α-radiation, β-radiation, γ-radiation, electron radiation, or ultraviolet radiation and is preferably γ-radiation or electron radiation. The radiation dose is preferably in the range of 1 to 1000 kGy, more preferably in the range of 10 to 800 kGy, even more preferably in the range of 20 to 600 kGy, particularly preferably in the range of 30 to 400 kGy, and extremely preferably in the range of 50 to 200 kGy. If the radiation dose is excessively low, the amount of radicals produced in the membrane (I) exposed to the radiation (the amount of radical production) may be so small that the graft polymerization is difficult to accomplish in a preferred manner. If the radiation dose is excessively high, the membrane (I) exposed to the radiation may be decomposed, or an excess of radicals produced in the membrane (I) exposed to the radiation may cause an excessive polymerization reaction.

A reaction in a solid-liquid two phase system will now be described as an example of the graft polymerization reaction process which may be performed in the production method of the present embodiment and which includes the step of applying radiation. A polymerizable monomer solution is placed in a container made of glass or stainless steel. To remove oxygen which can inhibit the grafting reaction, the polymerizable monomer solution is degassed under reduced pressure and/or bubbled with an inert gas such as nitrogen. Next, the membrane (I) exposed to radiation beforehand is put into the polymerizable monomer solution to allow graft polymerization to take place. Subsequently, the resulting membrane including a graft polymer having a graft chain introduced as a result of polymerization of the polymerizable monomer is taken out of the solution. To remove the solvent, the unreacted polymerizable monomer, and the polymer which has been formed from the polymerizable monomer and which is other than the graft polymer, the membrane obtained is washed with a solvent, for example, two to six times and then dried. The solvent used for the washing may be a solvent in which the polymerizable monomer and the other polymer formed from the polymerizable monomer are readily soluble and in which the membrane and the graft polymer are poorly soluble or preferably insoluble. The solvent is, for example, acetone, methanol, ethanol, or water.

The polymerizable monomer solution contains a polymerizable monomer containing a vinyl group and a functional group capable of having anion-exchange ability. The vinyl group can serve as the polymerizable group of the monomer. The polymerizable monomer solution may, if necessary, contain a solvent, another monomer, an additive, etc.

In one form, the membrane (I) to be exposed to radiation includes a resin forming the phase A and a polymer contained in the phase B'. In a more specific form of the membrane (I), the phase A which is a matrix phase is in the form of a porous membrane, while the phase B' is formed to fill the pores of the porous membrane. The phase B' in this form is a continuous phase extending continuously from the first principal surface to the second principal surface of the membrane (I) through the pores of the porous membrane which is the phase A. As previously stated, it is not necessary that all of the regions belonging to the phase B' be a continuous region. From another aspect, the membrane (I) in this form is composed of a porous membrane and a polymer phase filling the pores of the porous membrane.

The thickness of the membrane (I) is not particularly limited and may be, for example, in the range of 5 µm to 250 µm or in the range of 10 to 100 µm.

For the phase A, the same explanations as those previously given for the electrolyte membrane are omitted.

The polymer contained in the phase B' has the same feature as the "polymer forming the main chain" described for the electrolyte membrane, and preferred examples of the polymer contained in the phase B' are also the same as those of the "polymer forming the main chain". For example, the polymer contained in the phase B' preferably has no functional group capable of having anion-exchange ability, and preferably contains a polar group (except for functional groups having anion-exchange ability). The polar group is preferably at least one selected from the group consisting of a hydroxyl group, a carboxyl group, an ester group, an ether group, an amide group, and an amino group. The polar group is more preferably a hydroxyl group, because in this case the polymer having the polar group exhibits high alkali resistance and is resistant to staining. The polar group may be one introduced into the polymer by a treatment for introducing the polar group.

In an example of the production method of the present embodiment, a graft chain having a functional group capable of having anion-exchange ability is introduced into the polymer contained in the phase B' and having no functional group capable of having anion-exchange ability, with the polymer serving as a main chain. The polymer thus produced can be a graft polymer having a main chain having no functional group capable of having anion-exchange ability and a graft chain bonded to the main chain and having a functional group capable of having anion-exchange ability.

In the production method of the present embodiment, it is preferable that the resin forming the phase A be hydrophobic and the polymer contained in the phase B' have an appropriate level of hydrophilicity. With the use of such a resin and polymer, it is easier to introduce a graft chain selectively into the polymer contained in the phase B'. A possible reason for this is as follows. The polymerizable monomer for forming the graft chain has good hydrophilicity due to having a functional group capable of having anion-exchange ability. Such a polymerizable monomer is readily infiltrated into hydrophilic polymers. It is therefore inferred that, in this case, a graft chain can be formed in the phase B relatively easily, while a graft chain is not easily formed in the phase A because the polymerizable monomer is not readily infiltrated into hydrophobic resins.

The polymerizable monomer used in the production method of the present embodiment contains a vinyl group and a functional group capable of having anion-exchange ability. The functional group capable of having anion-exchange ability refers to a functional group having anion-exchange ability and/or a functional group that can be converted to a functional group having anion-exchange ability through a chemical reaction (conversion step). Examples of the functional group that can be converted to a functional group having anion-exchange ability through a chemical reaction include tertiary amine groups and secondary amine groups. Tertiary amine groups and secondary amine groups can be converted to functional groups having anion-exchange ability, for example, through a reaction with a halogenated alkyl. A specific example of the polymerizable monomer having such a functional group which can be converted through a conversion step is diallylmethylamine.

The graft chain introduced into the main chain formed of the polymer of the phase B' preferably has a structural unit containing a cyclic quaternary ammonium salt. Examples of such a structural unit are the above-described structural units represented by the formula (1) and formula (2), and the structural unit represented by the formula (1) is preferred. The polymerizable monomer is preferably a monomer that can be polymerized to form a structural unit containing a cyclic quaternary ammonium salt. Preferred examples of such a polymerizable monomer are monomers represented by the formula (3) and/or formula (4) shown below. The above-described structure represented by the formula (1) can be formed from the monomer represented by the formula (3), while the above-described structure represented by the formula (2) can be formed from the monomer represented by the formula (4). A specific example of the monomer represented by the formula (3) is diallyldimethylammonium chloride (DADMAC).

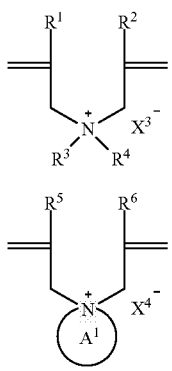

$R^1$ to $R^6$ and $A^1$ in the formulae (3) and (4) are the same as $R^1$ to $R^6$ and $A^1$ in the formulae (1) and (2). For electrolyte membranes, it is common practice to exchange the counter anion of the quaternary ammonium group for another anion where necessary. Thus, $X^{3-}$ and $X^{4-}$ are not particularly limited as long as they are not difficult to exchange for other anions, and can be known counter anions. For example, $X^{3-}$ and $X^{4-}$, like $X^{1-}$ and $X^{2-}$, are each independently a halide ion, a hydroxide ion, or an anion of an organic or inorganic acid.

The graft polymerization reaction can be carried out, for example, by bringing the membrane (I) and polymerizable monomer into contact. The polymerizable monomer may be subjected to graft polymerization by itself, or a solution of the polymerizable monomer in a solvent (polymerizable monomer solution) may be subjected to graft polymerization.

Examples of the solvent in which the polymerizable monomer is dissolved include: water; alcohols such as methanol, ethanol, and isopropanol; and aprotic polar solvents such as N,N-dimethylformamide (DMF), N,N-dimethylacetamide (DMAc), dimethyl sulfoxide (DMSO), and N-methylpyrrolidone (NMP). One solvent may be used alone or two or more solvents may be used.

The concentration of the polymerizable monomer in the polymerizable monomer solution can be adjusted depending on the polymerizability of the polymerizable monomer and/or the graft ratio to be achieved. The concentration is, for example, 20 wt % or more. When the concentration of the polymerizable monomer is excessively low, the graft polymerization reaction may not be sufficiently achieved.

To prevent the graft polymerization reaction from being inhibited by the presence of oxygen, it is preferable to remove oxygen from the polymerizable monomer and polymerizable monomer solution by a known method such as freeze-pump-thaw cycling or bubbling with a gas such as nitrogen gas.

The reaction time during which the graft polymerization is allowed to proceed is, for example, 10 minutes to 12 hours. The reaction temperature at which the graft polymerization is allowed to proceed is, for example, 0 to 90° C., and can be 40 to 80° C. The graft ratio can be controlled by adjusting the reaction temperature and reaction time.

The graft ratio, which is the ratio of the weight of a graft chain introduced into a membrane to the weight of the membrane before the graft polymerization, is, for example, in the range of 5 to 200%, and can be in the range of 5 to 30%. Increasing the graft ratio can improve the ionic conductivity of the resulting electrolyte membrane. The term "graft ratio" as used herein refers to the ratio of the weight of a graft chain introduced into a membrane to the weight of the membrane before the graft polymerization. This graft ratio is different from the below-described ratio of the weight of the graft chain to the weight of the main chain. The latter ratio is referred to herein as "graft ratio G" to distinguish it from the former "graft ratio".

The graft ratio G, which is the ratio of the weight of the introduced graft chain to the weight of the main chain, is, for example, in the range of 10 to 100%, and can be in the range of 15 to 35%. When such a graft ratio G is achieved, the resulting electrolyte membrane can exhibit a more appropriate level of ionic conductivity.

The method for forming the membrane (I) is not limited. The membrane (I) having the phase A being in the form of a porous membrane and the phase B' formed to fill the pores of the porous membrane can be formed, for example, by filling the pores of the porous membrane composing the phase A with a polymer composing the phase B'. That is, the production method of the present embodiment can further include the step of forming the membrane (I) by filling the pores of a porous membrane composing the phase A with a polymer composing the phase B'. The use of a porous membrane as the phase A can reduce the expansion of the resulting electrolyte membrane in the in-plane direction. The porosity of the porous membrane may be in the range of 10 to 90% or in the range of 30 to 60%. The air permeability of the porous membrane, as expressed by a Gurley air permeability specified in JIS L 1096 (Method B), may be in the range of 0.5 to 210 seconds/100 cc. The average pore diameter of the porous membrane may be in the range of 0.1 to 15 μm or in the range of 0.1 to 2 μm. The average pore diameter can be measured, for example, by mercury intrusion porosimetry.

Examples of the method for filling the pores of a porous membrane with a polymer include: a method including the step of immersing the porous membrane in a liquid containing the polymer; and a method including the step of applying a liquid containing the polymer to the porous membrane. As the liquid containing the polymer, a liquid prepared by dissolving or dispersing the polymer in a liquid medium can be used. The liquid medium may be any liquid medium in which the polymer is soluble or dispersible, and examples include: a mixed liquid of water and an alcohol; and aprotic polar solvents such as dimethyl sulfoxide (DMSO) and N-methylpyrrolidone (NMP). A specific example of the liquid medium is a mixed liquid of water and 1-propanol. The mixing ratio between water and 1-propanol, as expressed by the water content in the mixed liquid, is, for example, 30 to 60 wt %. The membrane obtained as a result of the filling with the polymer is preferably dried at a temperature equal to or lower than the melting points of the porous membrane and the polymer filling the porous membrane.

The filling ratio of the porous membrane filled with the polymer can be adjusted depending on the type of the filling polymer. For example, the filling ratio, as expressed by the ratio of the weight of the filling polymer to the weight of the porous membrane filled with the polymer, may be in the range of 10 to 100% or in the range of 45 to 85%. When the filling ratio is in such a range, the resulting electrolyte membrane more reliably maintains the function as a separation membrane that separates an anode and a cathode from each other. Specifically, for example, when ethylene-vinyl alcohol copolymer is employed as the polymer for filling the pores of the porous membrane, the filling ratio in filling with the copolymer can be in the range of 45 to 85%. The filling ratio in filling with the ethylene-vinyl alcohol copolymer can be determined by the measurement method described in Examples.

In another method for forming the membrane (I), two kinds of solid-state resins are mixed together, and the mixture was subjected to melt coextrusion and thus formed into the membrane (I) having the phase A and phase B'. In still another method, two kinds of resins are individually dissolved to prepare two different solutions, then the solutions are mixed, and the mixed solution is cast into the form of the membrane (I) having the phase A and phase B'.

(MEA)

A MEA of the present embodiment includes the electrolyte membrane of the present disclosure.

Specifically, in an example of the MEA including the electrolyte membrane of the present disclosure, a catalyst layer is provided on a surface of the electrolyte membrane. Typically, the electrolyte membrane and catalyst layer are assembled together by a technique such as hot press. In general, a pair of catalyst layers, namely an anode catalyst layer and a cathode catalyst layer, are placed on the principal surfaces of the electrolyte membrane in such a manner that the electrolyte membrane is sandwiched between the catalyst layers. In general, the anode catalyst layer and cathode catalyst layer form a part of an anode electrode and a part of a cathode electrode, respectively. FIG. 1 shows an example of the MEA including the electrolyte membrane of the present invention. The MEA 1 shown in FIG. 1 includes an electrolyte membrane 2, an anode electrode 3, and a cathode electrode 4, the anode electrode 3 is placed on one principal surface of the electrolyte membrane 2, and the cathode electrode 4 is placed on the other principal surface of the electrolyte membrane 2.

The catalyst layers used can be, for example, catalyst layers included in known MEAs for use in anion-exchange fuel cells. The catalysts used, unlike catalysts in cation-exchange fuel cells, need not contain a noble metal such as platinum, and can be a base metal such as nickel, cobalt, iron, or silver. The details of the catalyst layer design, such as the contained catalysts, may be the same or different between the anode (anode catalyst layer) of the MEA and the cathode (cathode catalyst layer) of the MEA.

The anode electrode 3, cathode electrode 4, anode catalyst layer, and cathode catalyst layer may contain any materials as long as the effect of the present invention is obtained.

(Anion-Exchange Fuel Cell)

Figure 2:
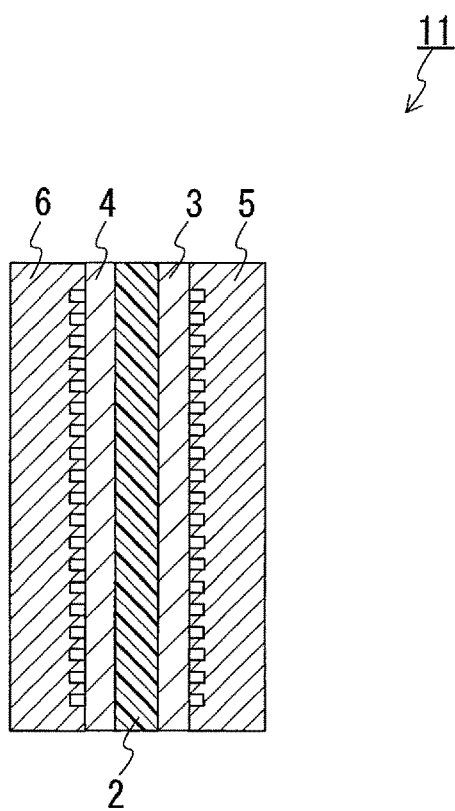
FIG. 2 is a cross-sectional view schematically showing an exemplary fuel cell including the MEA of the present invention.

An anion-exchange fuel cell of the present embodiment includes a MEA including the electrolyte membrane of the present disclosure. FIG. 2 shows an example of the main part of the anion-exchange fuel cell of the present embodiment. The anion-exchange fuel cell 11 shown in FIG. 2 includes a pair of electrodes (an anode electrode 3 and a cathode electrode 4) disposed to sandwich the electrolyte membrane and a pair of separators (an anode separator 5 and a cathode separator 6) disposed to sandwich the pair of electrodes, and these components are joined together by a pressure applied in a direction perpendicular to the principal surfaces of the components. The electrolyte membrane 2 and electrodes 3 and 4 form a MEA.

In the anion-exchange fuel cell of the present embodiment, a fuel is supplied to the anode, and an oxidant is supplied to the cathode. The fuel is, for example, hydrogen, an alcohol, or hydrazine (hydrate). The oxidant is, for example, oxygen or air.

In the anion-exchange fuel cell of the present embodiment, an inorganic base such as potassium hydroxide may be added to the fuel in order to increase the activity of the cell reaction and/or prevent catalyst poisoning by carbon dioxide.

The anion-exchange fuel cell of the present embodiment has high alkali resistance; thus, even when operated at elevated temperatures, this fuel cells is less likely to suffer from performance degradation caused by deterioration of the anion-exchange electrolyte membrane. Additionally, even if a peroxide is produced by a side reaction, the anion-exchange fuel cell of the present embodiment is less likely to suffer from leakage of the fuel or electrical short circuit between the anode and cathode and, for example, can more reliably maintain its safety as a cell.

The anion-exchange fuel cell of the present embodiment may include, in addition to the MEA of the present invention, other components known as components of anion-exchange fuel cells. Examples of the other components which may be included in the fuel cell to be configured as a fuel cell element include a gas diffusion layer and a separator, and examples of the other components which may be included in the fuel cell to be configured as a fuel cell system include a fuel feeder, an oxidant feeder, a humidifier, a current collecting plate, and components for detecting the state of electricity generation such as a temperature sensor, an oxygen sensor, a flow meter, and a humidity sensor.

EXAMPLES

Hereinafter, the present invention will be described in more detail by Examples. The present invention is not limited to Examples described below.

The term "room temperature" as used herein refers to a temperature of 23° C.

The abbreviations used for Examples and Comparative Example are as follows.

DADMAC: Diallyldimethylammonium chloride
EVOH: Ethylene-vinyl alcohol copolymer
EVOH (32): Ethylene-vinyl alcohol copolymer (containing 32 mol % ethylene units)
P(DAMA): Poly(diallylmethylamine)
1,4-DBB: 1,4-dibromobutane The physical properties of porous membranes used in Examples and Comparative Example and the physical properties of electrolyte membranes produced in Examples and Comparative Example were evaluated by the methods described below.

(Ion-Exchange Capacity)

Each of the $HCO_3$-type electrolyte membranes produced in Examples and Comparative Example was immersed in a 3 mol/L aqueous sodium chloride solution at 23° C. for 10 hours or more to change the counter anions of the electrolyte membrane to chloride ions. This electrolyte membrane was then dried in an 80° C. atmosphere for 1 hour, after which its weight W [g] was measured. Next, the dried electrolyte membrane was immersed in a 1 mol/L aqueous sodium nitrate ($NaNO_3$) solution for 12 hours or more, and M moles of liberated chloride ions were titrated with a 0.05 mol/L aqueous silver nitrate ($AgNO_3$) solution using a potentiometric titrator (COM-2500, manufactured by HIRANUMA SANGYO Co., Ltd.). The ion-exchange capacity (IEC) [mmol/g] of the electrolyte membrane was determined using the following equation.

$$\text{Ion-exchange capacity (IEC) [mmol/g]} = M \text{ [mol]} \times 1000/W \text{ [g]}$$

(Ionic Conductivity)

Each of the $HCO_3$-type electrolyte membranes produced in Examples and Comparative Example was cut into a 10-mm-wide piece, which was placed in water at 60° C. After 1 hour, the alternating-current impedance of the membrane was measured by a four-terminal method using a LCR meter (Chemical Impedance Meter 3532-80, manufactured by HIOKI E.E. CORPORATION). The measurement frequency range was from 10 kHz to 1 MHz. The real part of the measured impedance was plotted on the abscissa, and the imaginary part of the measured impedance was plotted on the ordinate. The real part of a minimum value was employed as a membrane resistance R [Ω]. The ionic conductivity [mS/cm] of the electrolyte membrane was determined using the following equation, where t denotes the thickness [μm] of the membrane, h denotes the width [cm] of the membrane, and L denotes the distance [cm] between the voltage measurement terminals.

Ionic conductivity [mS/cm]=($L$ [cm]$\times 10^3$)/ ($R$[Ω]$\times t$ [μm]$\times h$[cm]$\times 10^{-4}$)

(EVOH Filling Ratio)

The EVOH filling ratio of each porous membrane was determined by measuring the weight A1 of the porous membrane after exposure to an atmosphere at a temperature of 23° C. and a relative humidity of 55% for 12 hours or more and the weight A2 of the porous membrane after filling with EVOH and by calculating the following equation.

EVOH filling ratio (%)=100×{($A2-A1$)/$A2$}

(Graft Ratio)

The graft ratio was calculated using the following equation from the weight W2 of the membrane after graft polymerization and the weight W1 of the membrane before graft polymerization.

Graft ratio (%)=100×{($W2-W1$)/$W1$}

(EVOH-Based Graft Ratio G)

The graft ratio G with respect to the EVOH filling ratio (EVOH-based graft ratio G) was calculated using the following equation from the EVOH filling ratio FR (%) of the porous membrane, the weight W2 of the membrane after graft polymerization, and the weight W1 of the membrane before graft polymerization.

EVOH-based graft ratio $G$ (%)=100×{($W2-W1$)/ ($W1 \times FR/100$)}

(Amount of Area Change)

Each of the $HCO_3$-type electrolyte membranes produced in Examples and Comparative Example was cut into a size of about 20×30 mm. The amount of area change (%) of the electrolyte membrane was calculated using the following equation, where Area D denotes the area of the electrolyte membrane after exposure to an atmosphere at a temperature of 23° C. and a relative humidity of 55% for 12 hours or more, and Area W denotes the area of the membrane after immersion in ultrapure water maintained at 80° C. for 1 hour or more.

Amount of area change (%)=100×(Area $W$/Area $D-1$)

(Durability)

Each of the $HCO_3$-type electrolyte membranes produced in Examples and Comparative Example was cut into a size of about 5 cm×5 cm. Separately, a Fenton's reagent solution having an iron(II) sulfate concentration of 300 ppm and a hydrogen peroxide concentration of 3 wt % was prepared by adding a solution of iron(II) sulfate heptahydrate in ultrapure water (concentration: 3000 ppm on a weight basis) to a hydrogen peroxide solution. Next, 50 mL of the prepared Fenton's reagent solution was placed in a fluorine-based closed container, and the cut piece of the electrolyte membrane was immersed in the solution for 3 hours with the temperature maintained at 60° C. Subsequently, the electrolyte membrane was taken out of the container, washed with ultrapure water, and then dried in an oven maintained at 60° C. for 30 minutes. After that, the air permeability of the electrolyte membrane was evaluated by the method of Gurley air permeability measurement (JIS L 1096, Method B). An electrolyte membrane was rated as "Good" when air did not pass through the membrane at least for 10 minutes after the start of the evaluation, while when air passage through an electrolyte membrane was observed within 10 minutes after the start of the evaluation, the electrolyte membrane was rated as "Poor". "Good" indicates that the electrolyte membrane has high resistance to peroxides, while "Poor" indicates that the peroxide resistance of the electrolyte membrane was low.

(Air Permeability)

The air permeability (Gurley air permeability) of each porous membrane was measured according to JIS L 1096 (Method B).

(Water Content)

The water content of EVOH (32) was measured by the following method. A measurement sample was prepared, and this sample was allowed to stand in a dryer maintained at 60° C. for 2 hours or more to dry the sample until no weight change was observed. The dried sample was cooled in a desiccator. The cooled sample was taken out of the desiccator and then immediately weighed. The weight thus measured was defined as the weight of the dried sample. Next, the sample whose dry weight was measured was immersed in water maintained at 30° C., and the sample was kept in this state for 2 hours or more until no weight change of the sample was observed. The sample was then taken out of water, excess of water adhering to the surface of the sample was wiped off with filter paper or the like, and the weight of the water-impregnated sample was measured. The water content is the ratio of the weight difference determined by subtracting the weight of the dried sample from the weight of the water-impregnated sample to the weight of the dried sample. The water content of EVOH (32) was 10%.

(Porosity of Porous Membrane)

Each porous membrane was cut into a predetermined size (10 cm×10 cm, for example), and the volume and weight of the cut piece of the membrane were determined. The determined values were then substituted into the following equation to calculate the porosity of the membrane. The specific gravity of the resin forming the porous membrane was assumed to be 1 g/cm$^3$.

Porosity (%)=100×{($V-W$)/$V$}

V: Volume (cm$^3$)

W: Weight (g)

(Average Pore Diameter of Porous Membrane)

The average pore diameter of each porous membrane was calculated using mercury intrusion porosimetry. A measurement sample cut into an about 25-mm-wide piece was prepared, and the entire sample was placed into a standard 5-cc cell. The pore size distribution of the porous membrane was measured using a pore size distribution measurement instrument (Micromeritics AutoPore 9520, manufactured by Shimadzu Corporation) with the measurement pressure varying from an initial pressure of about 20 KPa (about 3 psia, corresponding to a pore diameter of about 60 μm) to about 400 MPa (about 60000 psia, corresponding to a pore diameter of about 3 nm). The volume-based median diameter thus calculated was employed as the average pore diameter of the porous membrane.

The physical properties of the porous ultrahigh molecular weight polyethylene membranes used in Examples and Comparative Example were as follows.

TABLE 1

| Porous membrane | Porosity (%) | Thickness (μm) | Air permeability (sec/100 cc) | Average pore diameter (μm) |
|---|---|---|---|---|
| a | 43 | 12 | 195 | 0.15 |
| b | 47 | 15 | 126 | 0.16 |
| c | 40 | 13 | 208 | 0.14 |
| d | 60 | 12 | 141 | 0.28 |
| e | 80 | 14 | 22 | 1.46 |
| f | 55 | 11 | 79 | 0.16 |
| g | 30 | 75 | 0.5 | 10 |

Example 1

The porous membrane a with a size of 10 cm×10 cm was immersed in a 10 wt % solution of EVOH (32) (solvent: water/1-propanol mixture at a weight ratio of 40/60) at room temperature for 5 minutes. After that, the immersed membrane was taken out of the solution and spread on a polyester film. The solution of EVOH (32) adhering to the surface of the immersed membrane was tailored so that a 50-μm-thick coating was formed on the porous membrane. After that, this membrane was placed in a lidded container and dried at 70° C. for 2 hours. The membrane was then separated from the polyester film to obtain a membrane (I) consisting of the porous membrane a filled with EVOH. Next, the obtained membrane (I) was hot-pressed at 100° C. for 5 minutes, and then electron radiation at 90 kGy was applied to this membrane under nitrogen at room temperature. The irradiated membrane was stored in a −60° C. atmosphere before the subsequent step was carried out.

100 mL of an aqueous solution containing 60 wt % of DADMAC (manufactured by Tokyo Chemical Industry Co., Ltd.) was placed in a test tube. Next, oxygen was removed from the system by bubbling with nitrogen gas for 2 hours. In this way, a polymerizable monomer solution was obtained.

After that, the electron-irradiated membrane prepared beforehand was immersed in the aqueous polymerizable monomer solution maintained at 70° C. for 5 hours to achieve a graft polymerization reaction in which a DADMAC chain was introduced as a graft chain into a main chain formed of the EVOH filling the porous membrane. Next, the membrane was taken out of the solution and then washed by repeating immersion of the membrane in water for 1 hour or more several times. After that, the membrane was placed in a drying oven maintained at 60° C. and was dried for 2 hours to obtain a grafted membrane. The graft ratio of the grafted membrane obtained was 9.6%. Next, the grafted membrane obtained was immersed in a 1 mol/L aqueous KOH solution for 2 hours and thus allowed to undergo counterion exchange. Subsequently, the grafted membrane having undergone the ion exchange was washed with pure water and then subjected to bubbling with carbon dioxide gas in pure water for 30 minutes, giving an electrolyte membrane having a carbonate ion-type ($HCO_3$-type) quaternary ammonium salt group.

Examples 2 to 7

Electrolyte membranes having a carbonate ion-type quaternary ammonium salt group were obtained in the same manner as in Example 1, except for using porous membranes listed in Table 2 instead of the porous membrane a.

Comparative Example 1

The porous membrane a with a size of 10 cm×10 cm was spread on the surface of a polyester film. 2.4 g of a solution of a mixture of P(DAMA) and 1,4-DBB in ethanol (molar ratio of amine units derived from P(DAMA)/1,4-DBB=2/1, solids concentration=4 wt %) was applied onto the porous membrane a to fill the pores of the porous membrane with the solution. After that, the entire resulting product was placed in a lidded container and dried at 70° C. for 2 hours. After the drying, the porous membrane was separated from the polyester film to obtain an electrolyte membrane consisting of a porous membrane filled with a component produced by partial crosslinking of P(DAMA) with 1,4-DBB. The filling ratio of this electrolyte membrane filled with the electrolyte component (the ratio of the weight difference determined by subtracting the weight of the porous membrane a before filling from the weight of the electrolyte membrane after filling to the weight of the porous membrane a before filling) was 29.4%.

Tables 2 and 3 show the physical properties of the electrolyte membranes produced in Examples 1 to 7 and Comparative Example 1, together with the porous membranes used for the production of the electrolyte membranes.

TABLE 2

| | Porous membrane | EVOH filling ratio (%) | Graft ratio (%) | EVOH-based graft ratio G (%) | Ionic conductivity (mS/cm) | Amount of area change (%) | Durability |
|---|---|---|---|---|---|---|---|
| Example 1 | a | 48.8 | 9.6 | 19.6 | 6.7 | 2.2 | Good |
| Example 2 | b | 59.0 | 15.3 | 26.0 | 10.4 | 6.0 | Good |
| Example 3 | c | 56.9 | 15.2 | 26.8 | 8.9 | 10.4 | Good |
| Example 4 | d | 67.2 | 18.9 | 28.2 | 12.9 | 5.9 | Good |
| Example 5 | e | 81.9 | 22.4 | 27.4 | 7.7 | 3.9 | Good |
| Example 6 | f | 65.9 | 20.2 | 30.6 | 10.5 | 4.4 | Good |
| Example 7 | g | 45.7 | 11.0 | 24.2 | 7.0 | 8.1 | Good |

TABLE 3

| | Porous membrane | Electrolyte component filling ratio (%) | Amount of area change (%) | Durability |
|---|---|---|---|---|
| Comparative Example 1 | a | 29.4 | 6.0 | Poor |

In Examples 1 to 7, the ionic conductivity and the amount of area change were achieved at levels sufficient for use as electrolyte membranes of fuel cells. Additionally, the durability of the electrolyte membranes of Examples 1 to 7 was "Good". This indicates that, in the electrolyte membranes of Examples 1 to 7, holes extending from the first principal surface to the second principal surface were not formed even after the severe durability test using hydrogen peroxide. The electrolyte component of the electrolyte membranes of Examples 1 to 7 is a graft polymer produced by introduction of a graft chain having a DADMAC structure into EVOH, and the good result of the durability evaluation can be attributed to the fact that the EVOH structure is maintained even when the DADMAC-derived structure is decomposed in the severe durability test using hydrogen peroxide. By contrast, in Comparative Example 1, the durability of the membrane was rated as "Poor", although the amount of area change was achieved at a level sufficient for use as an electrolyte membrane. The air permeability exhibited by the electrolyte membrane of Comparative Example 1 after the durability test was 230 sec/100 cc. The electrolyte component of the electrolyte membrane of Comparative Example 1 was a crosslinked polymer resulting from crosslinking of P(DAMA) with 1,4-DBB and having a molecular structure analogous to the DADMAC polymer chain. It can be inferred that the durability test using hydrogen peroxide caused decomposition of P(DAMA), which led to erosion of the entire polymer filling the pores of the porous membrane and therefore to formation of holes extending from the first principal surface to the second principal surface of the electrolyte membrane.

When the electrolyte membrane of the present invention is used as an electrolyte membrane of a fuel cell, the membrane is expected, for example, to block passage of gas (oxygen) and prevent direct mixing of oxygen and a fuel. Additionally, since the formation of holes extending from the first principal surface to the second principal surface of the electrolyte membrane during the use of the membrane can be prevented, it is expected that crossover of the fuel is not likely to occur and the insulation can be maintained to prevent electrical short circuit. It is also expected that the electrolyte membrane is resistant to breakage and enables the cell to more reliably maintain its function.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The electrolyte membrane of the present invention can be used in the same applications as conventional electrolyte membranes, in particular conventional anion-conductive electrolyte membranes.

The invention claimed is:
1. An electrolyte membrane comprising a phase A forming a matrix phase, and a phase B, wherein
the phase B is continuous from a first principal surface of the electrolyte membrane to a second principal surface of the electrolyte membrane opposite to the first principal surface,
the phase B comprises a graft polymer having a main chain and a graft chain, and
the graft chain has a functional group having anion-exchange ability.
2. The electrolyte membrane according to claim 1, wherein
the matrix phase is in the form of a porous membrane, and the phase B is formed to fill pores of the porous membrane.
3. The electrolyte membrane according to claim 1, wherein the main chain of the graft polymer has no functional group having anion-exchange ability.
4. The electrolyte membrane according to claim 1, wherein the main chain of the graft polymer has a polar group.
5. The electrolyte membrane according to claim 4, wherein the polar group is at least one selected from the group consisting of a hydroxyl group, a carboxyl group, an ester group, an ether group, an amide group, and an amino group.
6. The electrolyte membrane according to claim 1, wherein the graft chain has a structural unit containing a cyclic quaternary ammonium salt.
7. The electrolyte membrane according to claim 6, wherein the structural unit containing a cyclic quaternary ammonium salt is a structural unit represented by the following formula (1):

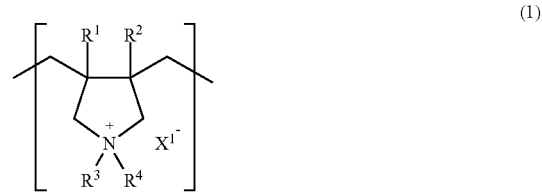

wherein $R^1$ to $R^4$ are each independently a hydrogen atom or an alkyl group having 1 to 8 carbon atoms, and $X^{1-}$ is a halide ion, a hydroxide ion, or an anion of an organic or inorganic acid.
8. A membrane-electrode assembly for a fuel cell, comprising the electrolyte membrane according to claim 1.
9. An electrolyte membrane production method for producing the electrolyte membrane according to claim 1, comprising:
applying radiation to a membrane (I) having a phase A forming a matrix phase and a phase B' containing a polymer; and
introducing a graft chain into the polymer contained in the phase B' with the polymer serving as a main chain, and thereby forming a graft polymer having the main chain and the graft chain, wherein
the graft chain is a polymer chain derived from a polymerizable monomer containing a vinyl group and a functional group capable of having anion-exchange ability.
10. The electrolyte membrane production method according to claim 9, further comprising forming the membrane (I) by filling pores of a porous membrane composing the phase A with the polymer composing the phase B'.
11. The electrolyte membrane production method according to claim 9, wherein the main chain has no functional group capable of having anion-exchange ability.
12. The electrolyte membrane production method according to claim 9, wherein the main chain has a polar group.
13. The electrolyte membrane production method according to claim 12, wherein the polar group is at least one selected from the group consisting of a hydroxyl group, a carboxyl group, an ester group, an ether group, an amide group, and an amino group.

14. The electrolyte membrane production method according to claim 9, wherein the graft chain has a structural unit containing a cyclic quaternary ammonium salt.

15. The electrolyte membrane production method according to claim 14, wherein the structural unit containing a cyclic quaternary ammonium salt is a structural unit represented by the following formula (1):

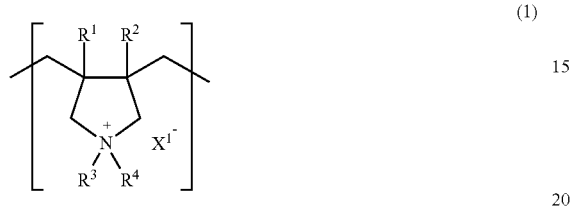

(1)

wherein $R^1$ to $R^4$ are each independently a hydrogen atom or an alkyl group having 1 to 8 carbon atoms, and $X^{1-}$ is a halide ion, a hydroxide ion, or an anion of an organic or inorganic acid.

* * * * *